United States Patent [19]
Akazaki et al.

[11] Patent Number: 5,568,799
[45] Date of Patent: Oct. 29, 1996

[54] FUEL INJECTION CONTROL SYSTEM FOR INTERNAL COMBUSTION ENGINES

[75] Inventors: Shusuke Akazaki; Yoichi Nishimura, both of Wako, Japan

[73] Assignee: Honda Giken Kogyo Kabushiki Kaisha, Tokyo, Japan

[21] Appl. No.: 495,026

[22] Filed: Jun. 27, 1995

[30] Foreign Application Priority Data

Jul. 6, 1994 [JP] Japan ........................... 6-177664

[51] Int. Cl.⁶ ............................................ F02D 41/04
[52] U.S. Cl. .................................. 123/480; 123/492
[58] Field of Search .............................. 123/478, 480, 123/486, 492, 493

[56] References Cited

U.S. PATENT DOCUMENTS

| | | | |
|---|---|---|---|
| 4,785,784 | 11/1988 | Nanyoshi et al. | 123/478 |
| 4,961,411 | 10/1990 | Oshiage et al. | 123/478 |
| 5,137,000 | 8/1992 | Stepper et al. | 123/492 |
| 5,333,583 | 8/1994 | Matsuura | 123/478 |

FOREIGN PATENT DOCUMENTS

| | | | |
|---|---|---|---|
| 63-129141 | 6/1988 | Japan . | |
| 5-231223 | 9/1993 | Japan . | |
| 94/01668 | 1/1994 | WIPO | 123/492 |

*Primary Examiner*—Willis R. Wolfe
*Attorney, Agent, or Firm*—Nikaido Marmelstein Murray & Oram LLP

[57] ABSTRACT

A fuel injection control system for an internal combustion engine calculates an amount of fuel to be injected in a manner carrying out fuel transfer delay-dependent correction based on a delay of transfer of fuel injected from the time the fuel is injected into the intake passage of the engine to the time the fuel is drawn into a corresponding one of an at least one cylinder of the engine, with a predetermined calculating repetition period, and causes fuel injection to be carried out based on a result of the calculation. The amount of fuel to be injected is corrected during execution of the fuel injection based on a newest value of the result of the calculation.

26 Claims, 12 Drawing Sheets

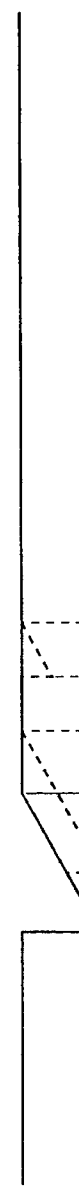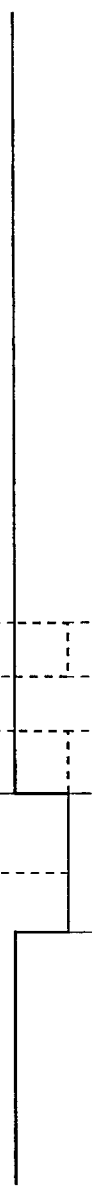

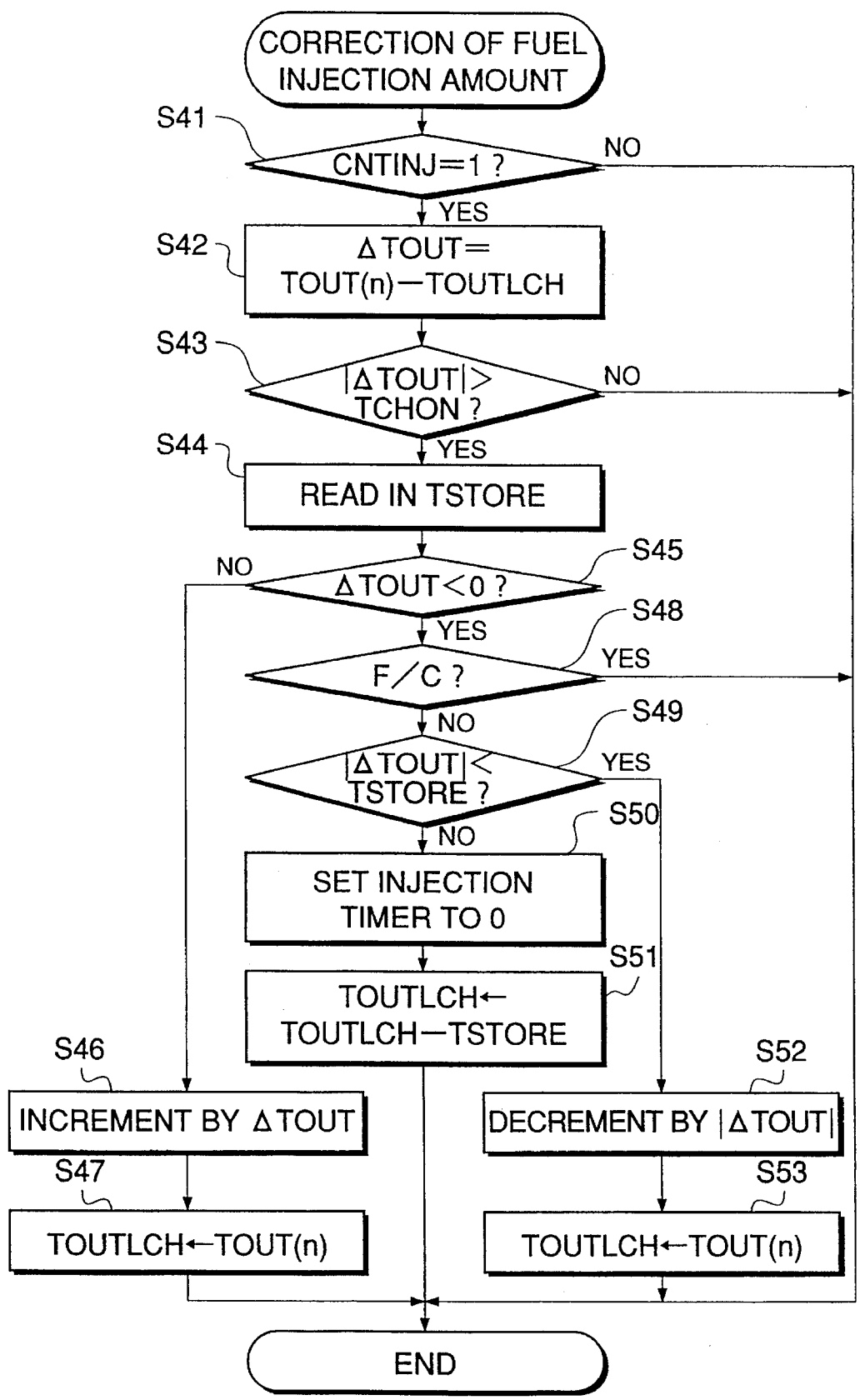

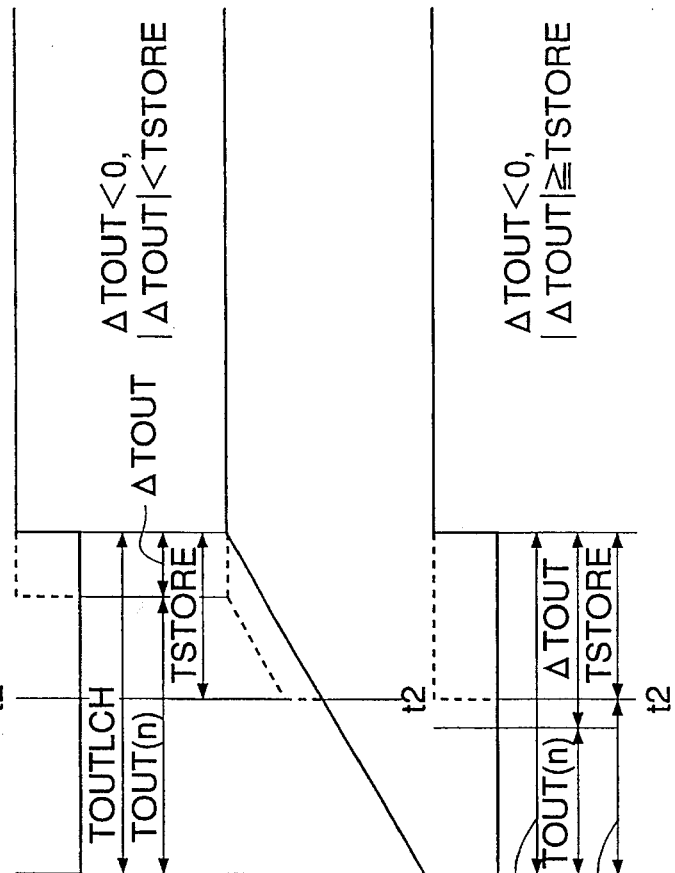

FUEL INJECTION CONTROL SYSTEM FOR INTERNAL COMBUSTION ENGINES

BACKGROUND OF THE INVENTION

1. Field of the Invention

This invention relates to a fuel injection control system for internal combustion engines, for controlling the amount of fuel injected into the intake pipe of the engine and the timing of injection of the fuel.

2. Prior Art

Conventionally, a fuel injection control system of this kind has been proposed by Japanese Laid-Open Patent Publication (Kokai) No. 63-129141, in which, to overcome the inconvenience of an insufficient fuel supply which is liable to occur when load on an internal combustion engine drastically increases, e.g. during acceleration of the engine the timing of fuel injection is set for each combustion cycle such that fuel is injected over two different time periods, i.e. a first injection time period well in advance of the intake stroke, and a second injection time period closer to the intake stroke, whereby the whole amount of fuel calculated for the combustion cycle is injected over the first injection time period, and if required, an additional amount of fuel supply calculated for a shortage in the fuel amount due to a change in load on the engine detected over a time interval between the two injection time periods is injected over the second injection time period for replenishment of the fuel supply.

Further, another kind of fuel injection control system adapted to perform split injection for a cylinder so as to avoid an overlapping time period during which an intake valve and an exhaust valve concurrently open for the cylinder has been proposed by Japanese Laid-Open Patent Publication (Kokai) No. 52-31223, in which if the start of a first fuel injection is delayed due to a sudden change in operating conditions of the engine, a second fuel injection is carried out to inject an amount of fuel which should have been injected in the first fuel injection, depending on the operating conditions of the engine and the delay of the start of the first fuel injection, or alternatively the termination of the first fuel injection is retarded by a time period corresponding to the delay of the start of the first fuel injection.

However, according to the former proposed control system, even if it is determined during the first injection time period that the fuel injection amount should be increased, the short amount of fuel supply is not actually replenished until the second fuel injection, which results in still insufficient controllability of the air-fuel ratio of a mixture supplied to the engine. Further, this prior art does not contemplate cases in which the amount of fuel injection is required to be decreased due to a change in the operating conditions of the engine, which prevents improvement in the controllability of the engine upon a sudden decrease in load on the engine.

Further, the fuel injection control by the latter proposed control system compensates for a delay in the start of fuel injection, but does not correct the amount of fuel injection per se, which also leaves room for improvement in the controllability.

SUMMARY OF THE INVENTION

It iS an object of the invention to provide a fuel injection control system for an internal combustion engine, which is capable of improving the controllability of the air-fuel ratio of a mixture to be supplied to the engine when the engine is in transient operating conditions.

To attain the above object, the present invention provides a fuel injection control system for an internal combustion engine having an intake passage, and at least one cylinder, including:

fuel injection means for injecting fuel into the intake passage;

fuel injection amount-calculating means for calculating an amount of fuel to Be injected by the fuel injection means in a manner carrying out fuel transfer delay-dependent correction based on a delay of transfer of fuel injected from the time the fuel is injected into the intake passage to the time the fuel is drawn into a corresponding one of the at least one cylinder, with a predetermined calculating repetition period, and for outputting a result of the calculation; and fuel injection-instructing, means responsive to the result of the calculation output by the fuel injection amount-calculating means, for causing the fuel injection means to execute the fuel injection during a fuel injection-permitting time period set to allow at least part of the amount of fuel injected by the fuel injection means to be drawn into the corresponding one cylinder during an intake stroke of a present operating cycle of the corresponding one cylinder.

The fuel injection control system according to the invention is characterized in that the fuel injection-instructing means corrects the amount of fuel to be injected by the fuel injection means during execution of the fuel injection, based on a newest value of the result of the calculation output by the fuel injection amount-calculating means during the execution of the fuel injection..

Preferably, when the newest value of the result of the calculation output by the fuel injection amount-calculating means obtained after termination of the fuel injection is larger than an amount of fuel already injected based on the amount of fuel to be injected, during the fuel injection-permitting time period, the fuel injection-instructing means causes the fuel injection means to carry out an additional fuel injection, based on the amount of fuel already injected and the newest value of the result of the calculation output by the fuel injection amount-calculating means.

More preferably, the fuel injection-instructing means corrects an amount of fuel being currently injected, based on the newest value of the result of the calculation output from the fuel injection amount-calculating means during execution of the additional fuel injection.

Preferably, the injection amount-calculating means carries out the fuel transfer delay-dependent correction based on the delay of transfer of fuel injected, based on an amount of fuel adhering to the intake passage and an amount of fuel carried off from the fuel fuel adhering to the intake passage, calculation of the amount of the fuel adhering to the intake passage being carried out based on a total amount of fuel injected during the fuel injection-permitting time period.

Preferably, the fuel injection-instructing means does not correct the amount of fuel to be injected by the fuel injection means when a required amount of correction of the amount of fuel to be injected is smaller than a predetermined value.

Preferably, the fuel injection-instructing means does not correct the amount of fuel to be injected by the fuel injection means, when fuel cut is being carried out and at the same time the amount of fuel to be injected by the fuel injection means should be corrected in a decreasing direction.

Preferably, the fuel injection-instructing means immediately inhibits the fuel injection by the fuel injection means when a required amount of correction of the amount of fuel to be injected by the fuel injection means in a decreasing direction is larger than a portion of the amount of fuel remaining to be injected.

Preferably, the fuel injection-instructing means corrects the amount of fuel to be injected by the fuel injection means, based on a difference between an actual value of the amount of fuel to be injected, which is set for fuel injection being currently carried out, and the newest value of the result of the calculation output from the fuel injection amount-calculating means.

More preferably, the fuel injection-instructing means determines the difference between the actual value of the amount of fuel to be injected, which is set for fuel injection being currently carried out, and the newest value of the result of the calculation output from the fuel injection amount-calculating means, by subtracting the former from the latter, and when the difference assumes a negative value, if fuel cut is not being carried out and the absolute value of the difference is smaller than a remaining amount of fuel to be injected, the fuel injection-instructing means updating the actual value of the amount of fuel to be injected by subtracting the difference from the actual value of the amount of fuel to be injected, which is set for fuel injection being currently carried out.

More preferably, the fuel injection-instructing means determines the difference between the actual value of the amount of fuel to be injected, which is set for fuel injection being currently carried out, and the newest value of the result of the calculation output from the fuel injection amount-calculating means, by subtracting the former from the latter, and when the difference assumes a negative value, if fuel cut is not being carried out and the absolute value of the difference is larger than a remaining amount of fuel to be injected, the fuel injection-instructing means immediately inhibiting the fuel injection by the fuel injection means, and changing the actual value of the amount of fuel to be injected to a value obtained by subtracting the remaining amount of fuel to be injected from the actual value of the amount of fuel to be injected, for storage thereof.

More preferably, the fuel-instructing means includes memory means for separately storing values of the actual value of the amount of fuel to be injected for use in respective fuel injections carried out during the fuel injection-permitting time period.

The above and other objects, features, and advantages of the invention will become more apparent from the following detailed description taken in conjunction with the accompanying drawings.

BRIEF DESCRIPTION OF THE DRAWINGS

FIG. 6A to FIG. 6F collectively form a timing chart which is useful in explaining manners of correction of the amount of fuel injection, in which:

FIG. 6A shows changes in the stroke of a cylinder;

FIG. 6B shows changes in the stage of fuel injection control;

FIG. 6C shows changes in an output from an injection timer;

FIG. 6D shows changes in the operative state of a fuel injection valve;

FIG. 6E shows changes in the count (CNTINJ) of a status counter indicative of a status of fuel injection control, exhibited when neither the correction of a main injection nor an additional injection is carried out; and FIG. 6F shows changes in the count (CNTINJ) of the status counter, exhibited when the correction of the main injection and the additional injection are carried out;

FIG. 7A to FIG. 7E collectively form a timing chart showing examples of changes in the count (CNTINJ) of the status counter, in which:

FIG. 7A corresponds to FIG. 6E;

FIG. 7B corresponds to FIG. 6F;

FIG. 7C shows a case in which a forced injection termination stage is reached during the main injection;

FIG. 7D shows a case in which the forced injection termination stage is reached during the additional injection; and FIG. 7E shows changes in the stage of fuel injection control;

FIG. 8 is a flowchart showing a program for correcting the fuel injection amount during the main injection;

FIG. 9A to FIG. 9E collectively form a timing chart which is useful in explaining manners of correction of the fuel injection period, in which:

FIG. 9A and FIG. 9B show a base in which an amount of change ΔTOUT in the fuel injection period assumes a positive value;

FIG. 9C and FIG. 9D show a case in which the amount of change ΔTOUT assumes a negative value when fuel cut is not being carried out; and FIG. 9E shows a case in which the absolute value |ΔTOUT| of the amount of change is equal to or larger than a remaining fuel injection amount TSTORE;

DETAILED DESCRIPTION

The invention will now be described in detail with reference to the drawings showing an embodiment thereof.

Figure 1:
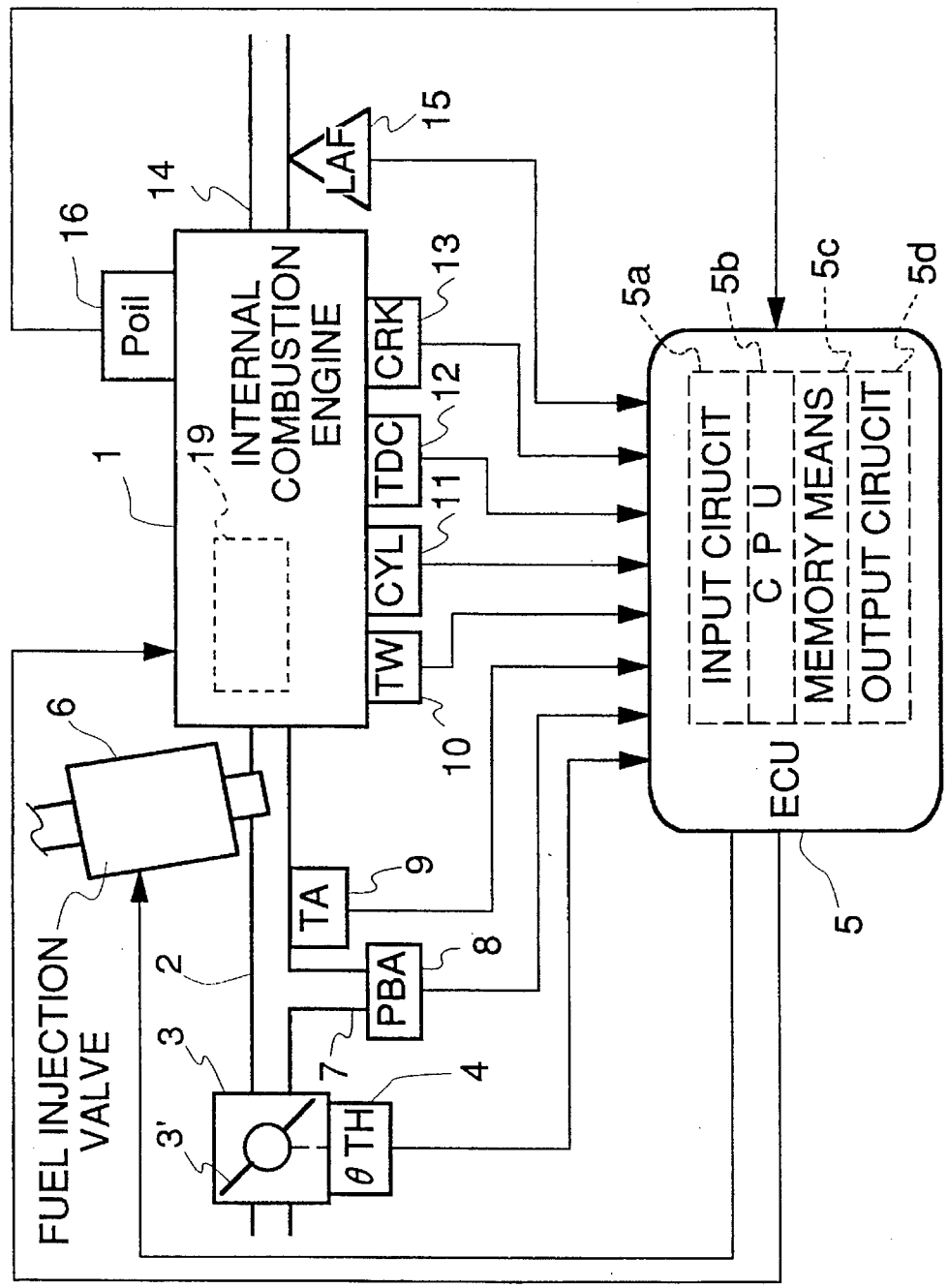
FIG. 1 is a diagram showing the arrangement of an internal combustion engine incorporating a fuel injection control system therefor, according to an embodiment of the invention.

Referring first to FIG. 1, there is illustrated the whole arrangement of an internal combustion engine and a fuel injection control system therefor, according to an embodiment of the invention.

In the figure, reference numeral 1 designates a DOHC straight type four-cylinder engine (hereinafter simply referred to as "the engine"), each cylinder being provided with a pair of intake valves, not shown, and a pair of exhaust valves, not, shown. This engine includes a valve timing changeover device 19 which is capable of changing valve timing of the intake valves and exhaust valves between a high speed valve timing suitable for a high speed operating region of the engine and a low speed valve timing suitable for a low speed operating region of the same. The term "valve timing" is used throughout the specification to mean operating characteristics of the valve, including the valve opening/closing timing, the valve opening period and the valve lift, and hence it Should be noted that "changeover of the valve timing" may also include "changeover of the valve lift".

Connected to an intake port, not shown, of the cylinder block of the engine 1 is an intake pipe 2 in which is arranged a throttle body 3 accommodating a throttle valve 3' therein. A throttle valve opening θ TH) sensor 4 is connected to the throttle valve 3' for generating an electric signal indicative of the sensed throttle valve opening θ TH and supplying the same to an electric control unit (hereinafter referred to as "the ECU") 5.

Fuel injection valves 6, only one of which is shown, are inserted into the intake pipe 2 at locations intermediate between the cylinder block of the engine 1 and the throttle valve 3' and slightly upstream of the respective intake valves. The fuel injection valves 6 are connected to a fuel pump, not shown, and electrically connected to the ECU 5 to have their valve opening periods controlled by signals therefrom.

Further, an intake pipe absolute pressure (PBA) sensor 8 is provided in communication with the interior of the intake pipe 2 via a conduit 7 opening into the intake pipe 2 at a location between the throttle valve 3' and the fuel injection valves 6, for supplying an electric signal indicative of the sensed absolute pressure PBA within the intake pipe 2 to the ECU 5.

An intake air temperature (TA) sensor 9 is inserted into the intake pipe 2 at a location downstream of the conduit 7, for supplying an electric signal indicative of the sensed intake air temperature TA to the ECU 5.

An engine coolant temperature (TW) sensor 10 formed of a thermistor or the like is inserted into a coolant passage filled with a coolant and formed in the cylinder block, for supplying an electric signal indicative of the sensed engine coolant temperature TW to the ECU 5.

A cylinder-discriminating (CYL) sensor 11, a TDC sensor 12, and a crank angle (CRK) sensor 13 are arranged in facing relation to a camshaft or a crankshaft, neither of which is shown, of the engine 1 at respective predetermined locations.

The CYL sensor 11 generate a pulse (hereinafter referred to as "CYL signal pulse(s)") at a predetermined crank angle of a particular cylinder of the engine whenever the crankshaft rotates through two rotations, and delivers the CYL signal pulse to the ECU 5.

The TDC sensor 12 generates a pulse (hereinafter referred to as "TDC signal pulse") at a predetermined 15 crank angle of the engine whenever the crankshaft rotates through 180 degrees, and delivers the TDC signal pulse to the ECU 5.

The CRK sensor 13 generates a pulse (hereinafter referred to as "CRK signal pulse") whenever the crankshaft rotates through a predetermined angle (e.g. 30 degrees) smaller than 180 degrees, i.e. at a repetition period shorter than a repetition period of the TDC signal pulse, and delivers the CRK signal pulse to the ECU 5.

These signal pulses from the CLY sensor 11, the TDC sensor 12 and the CRK sensor 13 are used for control of various kinds of timing, such as fuel injection timing and ignition timing, and detection of the engine rotational speed NE.

A linear output type air-fuel ratio sensor (hereinafter referred to as "the LAF sensor") 15 is arranged in an exhaust pipe 14 of the engine 1 for supplying an electric signal which is substantially proportional to the concentration of oxygen present in exhaust gases to the ECU 5.

The valve timing changeover device 19 is equipped with an electromagnetic Valve, not shown, for making changeover of the valve timing. The electromagnetic valve is connected to the ECU 5 to have its opening/closing operation controlled by a signal from the ECU 5. The electromagnetic valve selects either high or low hydraulic pressure to be applied to the valve timing changeover device 19. Responsive to this high or low hydraulic pressure selected, the valve timing changeover device 19 operates to change the valve timing to either the high speed valve timing or the low speed valve timing. The hydraulic pressure applied to the valve timing changeover device 19 is detected by a hydraulic pressure (oil pressure) (Poil) sensor 16 which supplies an electric signal indicative of the sensed hydraulic pressure POIL to the ECU 5.

The ECU 5 is comprised of an input circuit 5a having the functions of shaping the waveforms of input signals from various sensors such as ones mentioned above, shifting the voltage levels of sensor output signals to a predetermined level, converting analog signals from analog-output sensors to digital signals, and so forth, a central processing unit (hereinafter referred to as the "the CPU") 5b for carrying out processings described hereinbelow etc., memory means 5c formed of a ROM (read only memory)storing various operational programs which are executed by the CPU 5b, and various maps and tables, referred to hereinafter, and a RAM (random access memory) for storing results of calculations therefrom, etc., and an output circuit 5d which delivers driving signals to the fuel injection valves 6, the electromagnetic valve of the valve timing changeover device 19, etc.

Figure 2:
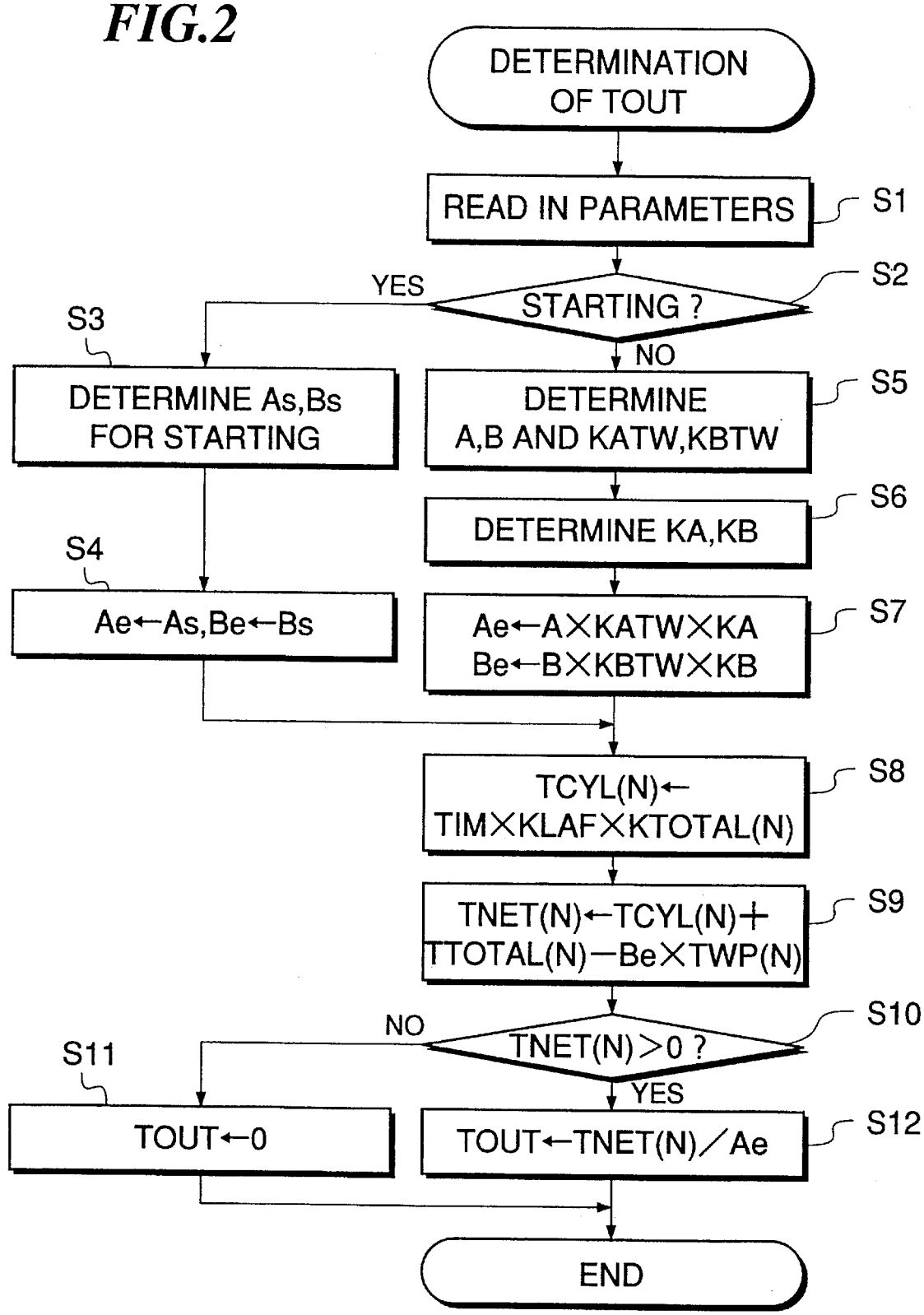
FIG. 2 is a flowchart showing a program for determining a fuel injection period (TOUT)

FIG. 2 shows a program for determining a valve opening period of each of the fuel injection valves, i.e. a fuel injection amount TOUT. This program is executed in synchronism with generation of each CRK signal pulse. It should be noted that the amount of fuel, including the fuel injection amount, is calculated in terms of a valve-opening period for which each of the fuel injection valves 6 is opened for fuel injection, and hence it has a dimension of "time".

First, at a step S1, the engine operating parameters detected by the aforemehtioned sensors are read in, and then it is determined at a step S2 whether or not the engine is being cranked. If the answer to this question is negative (NO), the program proceeds to a step S5, wherein a direct supply ratio A, a carry-off ratio B, a temperature-dependent correction coefficient KATW for correcting the direct supply ratio A, and a temperature-dependent correction coefficient KBTW for correcting the carry-off ratio B are determined.

The direct supply ratio A is defined as a ratio of an amount of fuel injected and directly drawn into a combustion chamber of the engine dyring an operating cycle (combustion cycle) of the engine to the whole amount of fuel injected from the fuel injection valve 6 during the operating cycle, while the carry-off ratio B is defined as a ratio of an amount of fuel carried off from fuel adhering to the inner wall surface of the intake pipe 2 and drawn into the combustion chamber due to evaporation, etc. during the operating cycle to the whole amount of the fuel adhering to the inner wall surface of the intake pipe 2 in the immediately preceding operating cycle. The direct supply ratio A and the carry-off ratio B are determined by retrieving respective maps according to the engine rotational speed NE and the intake pipe absolute pressure PBA. In these maps, the values of the direct supply ratio A and the carry-off ratio B are set to larger values as the engine rotational speed NE and/or the intake pipe absolute pressure PBA increase(s).

Figure 3A:
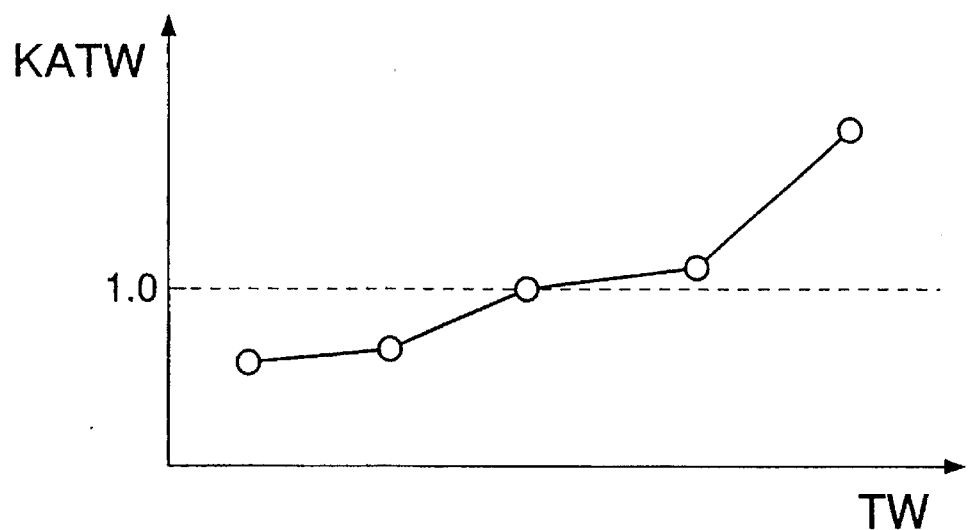
FIG. 3A shows a KATW table for use in determining a temperature-dependent correction coefficient (KATW) for correcting a direct supply ratio (A)
Figure 3B:
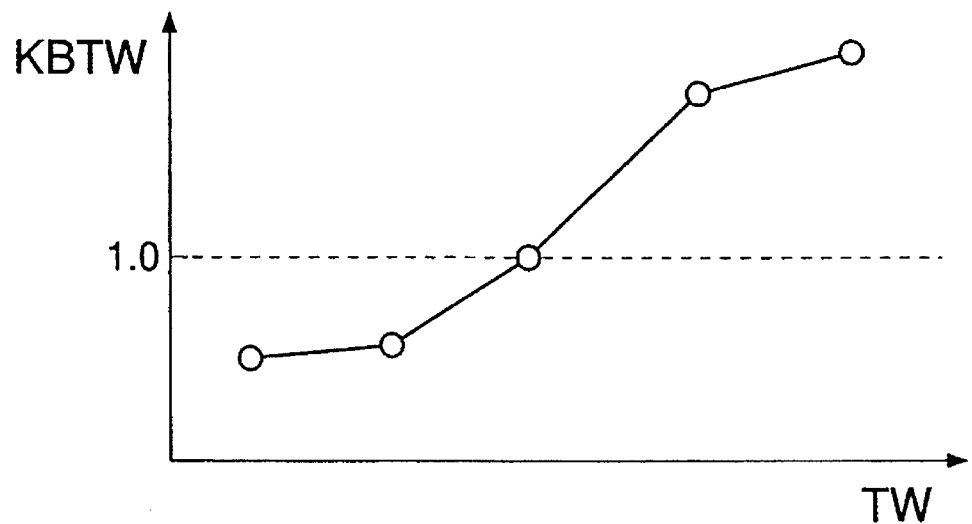
FIG. 3B shows a KBTW table for use in determining a temperature-dependent correction coefficient (KBTW) for correcting a carry-off ratio (B)

The temperature-dependent correction coefficients KATW and KBTW are determined by the use of tables which are set, e.g. as shown in FIG. 3A and FIG. 3B, respectively, such that the correction coefficients KATW and KBTW are set to larger values, as the engine coolant temperature TW assumes a higher value.

At the following step S6, correction coefficients KA and KB are determined according to at least one engine operating parameter other than the engine coolant temperature TW, e.g. a parameter dependent on whether the valve timing is set to the high speed valve timing or the low speed valve timing. It is preferable that these correction coefficients KA and KB are set according to a purging amount of evaporative fuel if the engine is equipped with an adsorbing device for adsorbing evaporative fuel therein for purging into the intake pipe. Further, it is also preferable that these correction coefficients KA and KB are also determined according to at amount of supply of assist air into the intake pipe, is the supply of assist air is carried out by an assist air-supply device, not shown. Further, it is preferable that they are also set according to an amount of recirculation of exhaust gases, if the exhaust gas recirculation is carried out by an exhaust gas recirculation system, not shown.

Then, a corrected direct supply ratio Ae and a corrected carry-off ratio Be are calculated by the use of the following equations (1) and (2), respectively, followed by the program proceeding to a step S8:

$$Ae = A \times KATW \times KA \quad (1)$$

$$Be = B \times KBTW \times KB \quad (2)$$

Figure 4A:
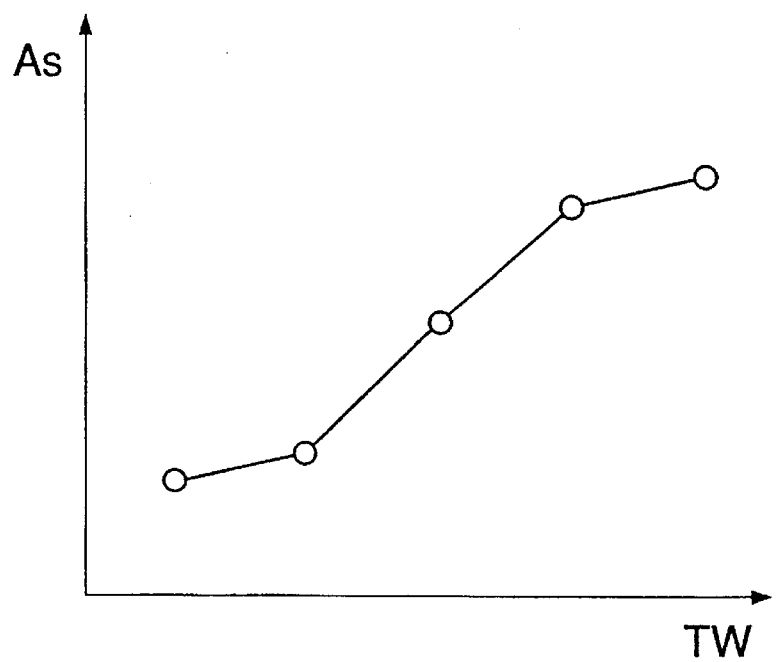
FIG. 4A shows an As table for use in determining a starting direct supply ratio (As) which is applied when the engine is being cranked.
Figure 4B:
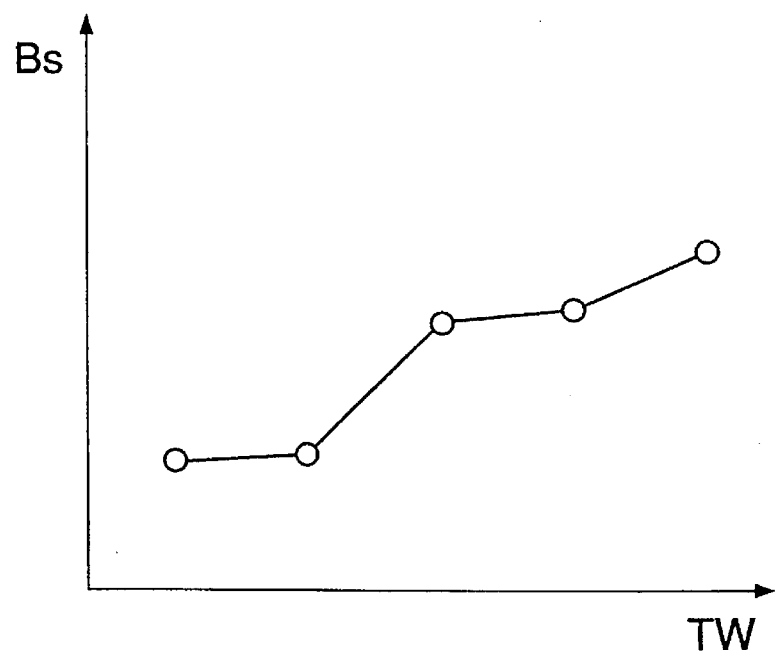
FIG. 4B shows a Bs table for use in determining a starting carry-off ratio (Bs) which is applied when the engine is being cranked.

On the other hand, if the answer to the question of the step S2 is affirmative (YES), a starting direct supply ratio As and a starting carry-off ratio Bs both applied during the start of the engine are determined at a step S3. The starting direct supply ratio As and the starting carry-off ratio Bs are determined by the use of respective tables which are set, e.g. as shown in FIG. 4A and FIG. 4B, respectively, such that the values of the starting direct supply ratio As and the starting carry-off ratio Bs increase as the engine coolant temperature TW increases. The starting direct supply ratio As and the starting carry-off ratio Bs are set to the corrected direct supply ratio Ae and the corrected carry-off ratio Be at a step S4, followed by the program proceeding to the step S8.

At the step S8, a required fuel amount TCYL(N), i.e. an amount of fuel required by each cylinder is calculated by the use of the following equation (3), and a combustion chamber supply fuel amount TNET(N), i.e. an amount of fuel to be supplied to the combustion chamber is calculated by the use of the following equation (4):

$$TCYL(N) = TIM \times KLAF \times KTOTAL(N) \quad (3)$$

$$TNET(N) = TCYL(N) + TTOTAL(N) - Be \times TWP(N) \quad (4)$$

where the suffix (N) represents the number of a cylinder to be supplied with fuel, and a parameter accompanied by this suffix is determined separately for each cylinder, TIM a basic fuel injection amount determined according to the engine rotational speed NE and the intake pipe absolute pressure PBA, KLAF an air-fuel ratio correction coefficient set based on the output from the LAF sensor 15, KTOTAL(N) the product of all correction coefficients, e.g. an engine coolant temperature-dependent correction coefficient KTW and a leaning correction coefficient KLS, excluding the air-fuel ratio correction coefficient KLAF, and TTOTAL(N) the sum of all addend correction terms (e.g. an acceleration enriching term TACC, etc.) which are determined based on engine operating parameters detected by various sensors including the aforementioned ones. However, an ineffective time period TV, referred to hereinafter is not included therein.

TWP(N) represents an adhering fuel amount, i.e. an (estimated) amount of fuel adhering to the inner wall surface of the intake pipe 2 calculated according to a routine described hereinafter with reference to FIG. 5, and hence (Be×TWP(N)) represents an amount of fuel carried off from the adhering fuel into the combustion chamber. This carried-off amount of the adhering fuel need not be newly supplied by injection, and hence is subtracted from the required fuel amount TCYL (N).

Then, at a step S10, it is determined whether or not the combustion chamber supply fuel amount TNET(N) calculated is larger than "0". If TNET≦0, the fuel injection amount TOUT (i.e. the valve-opening period of the fuel injection valve 6) is set to "0" at a step S11, whereas if TNET(N)>0, the fuel injection amount TOUT is calculated by the following equation (5) at a step S12, followed by terminating the present program:

$$TOUT = TNET(N)/Ae \quad (5)$$

The fuel injection valve 6 is instructed by the driving signal from the ECU 5 to open over a time period obtained by adding the ineffective time period TV, which is set according to battery voltage, to the TOUT value calculated by the equation (5), whereby an amount of fuel corresponding to a time period (TNET(N)+Be×TWP(N)) is supplied to the combustion chamber.

The value of the fuel injection amount TOUT is thus updated to the newest value whenever the above processing is carried out and the updated value is used for opening the fuel injection valve 6 at a predetermined injection start stage FISTG, and at the same time stored as latch data TOUPLCH to be used for calculation of the adhering fuel count TWP(N), and for correction of the fuel injection count TOUT, as will be described hereinbelow.

Figure 5:
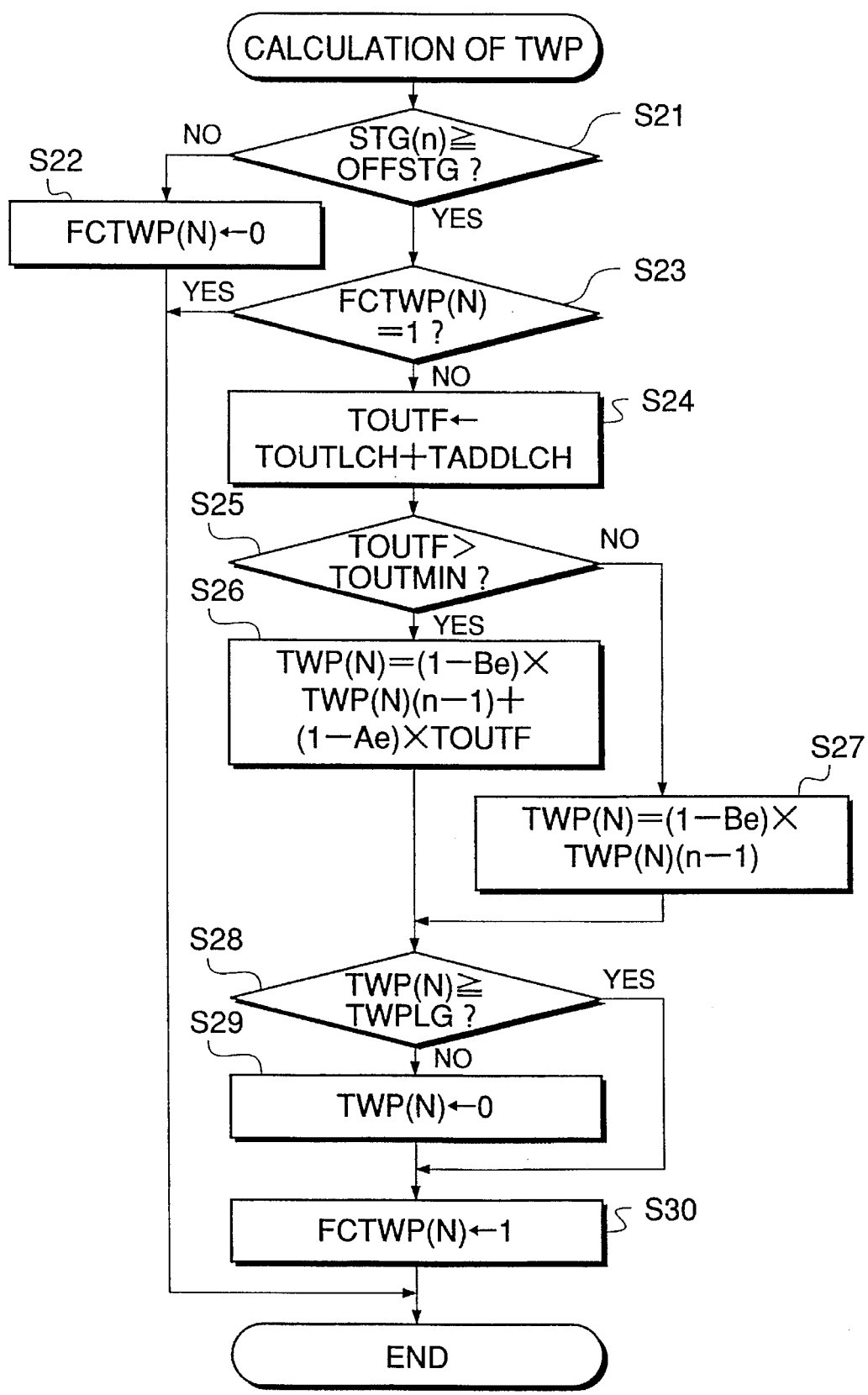
FIG. 5 is a flowchart showing a program for calculating an adhering fuel amount (TWP), i.e. an amount of fuel adhering to the inner wall surface of an intake pipe of the engine.

FIG. 5 shows details of the routine for calculating the adhering fuel amount TWP(N), which is executed in synchronism with generation of each CRK signal pulse. However, the adhering fuel amount TWP(N) is determined once during one operating cycle (i.e. whenever the crankshaft rotates through 720 degrees) for each cylinder. First, at a step S21, it is determined whether or not the present stage STG(n) comes after a forced injection termination stage OFFSTG for the cylinder, i.e. whether or Hot a time period during which fuel injection is permitted for the cylinder has elapsed. If the answer to this question is negative (NO), the program proceeds to a step S22, wherein a flag FCTWP(N), which is set to "1" to indicate termination of the calculation of the adhering fuel amount TWP(N), is set to "0", followed by immediately terminating the program. The term "stage" used throughout the specification means each of 24 divisions obtained by dividing one combustion cycle (four strokes), which corresponds to 720 degrees in terms of crank angle, by 30 degrees. #0 stage is assigned to the start of the compression stroke, and #23 stage to the termination of the intake stroke. Further, in the present embodiment, #22 stage is set to the forced injection termination stage OFFSTG, and hence the answer to the question of the step S21 becomes negative when the present stage is one of #0 stage through #21 stage, so that calculation of the adhering fuel amount TWP(N) is not carried out.

If the answer to the question of the step S21 becomes affirmative (YES), i.e. if the present stage is #22 stage or #23 stage, the program proceeds to a step S23, wherein it is determined whether or not the flag FCTWP(N) is equal to "1". If the answer to this question is affirmative (YES), the program is immediately terminated, whereas if the answer is negative (NO), i.e. if FCTWP(N)=0, the program proceeds to a step S24, wherein a final fuel injection amount TOUTF is calculated by the use of the following equation (6):

$$TOUTF=TOUTLCH+TADDLCH \qquad (6)$$

where TOUTLCH, which is already mentioned hereinabove as the latch data, represents an actual value of a main injection amount (fuel injection amount TOUT) or a corrected value of the main injection amount if a correction has been made thereto, and TADDLCH represents an actual value of an additional fuel injection amount or a corrected valve of the additional fuel injection amount if a correction has been made, thereto. The final fuel injection amount TOUTF (exclusive of the ineffective time period TV) is equivalent to an amount of fuel actually injected in one combustion cycle. The correction of the main injection amount (fuel injection amount TOUT) and the correction of the additional fuel injection amount will be described in detail herein below. The term "main injection amount" means the amount of a first fuel injection if the additional injection is carried out subsequently to the first fuel injection.

Then, at a step S25, it is determined whether or not the final fuel injection amount TOUTF is larger than a predetermined lower limit value TOUTMIN. If the condition of TOUTF>TOUTMIN is fulfilled, the adhering fuel amount TWP(N) is calculated by the use of the following equation (7) at a step S6:

$$TWP(N)=(1-Be) \times TWP(N)(n-1)+(1-Ae) \times TOUTF \qquad (7)$$

where TWP(N)(n−1) represents an immediately preceding value of the adherent fuel amount TWP(N). The first term on the right side represents an amount of fuel which has not been carried off from the adherent fuel and remains on the inner wall surface of the intake pipe 2 during the present operating cycle, and the second term on the right side represents an amount of fuel corresponding to a portion of fuel injected in the present operating cycle which has not been drawn into the combustion chamber and newly adhered to the inner wall surface of the intake pipe 2.

On the other hand, if the answer to the question of the step S25 is negative (NO), it means that no or almost no fuel has been injected, and then the program proceeds to a step S27, wherein the adherent fuel amount TWP(N) is calculated by the use of the following equation (8):

$$TWP(N)=(1-Be) \times TWP(N)(n-1) \qquad (8)$$

This equation (8) is equivalent to a modification of the equation (7) from which the second term on the right side is omitted. This is based on the fact that when the fuel injection amount is very small or negligible, there is no newly adhering fuel.

Following the step S26 or S27, it is determined at a step S28 whether or not the adherent fuel amount TWP(N) is equal to or larger than a predetermined guard value TWPLG. The predetermined guard value TWPLG is set to "0" or a very small value close to "0". If the answer to the question of the step S28 is negative (NO), the adherent fuel amount TWP (N) is set to "0" at a step S29 and then the program proceeds to a step S30, whereas if the answer is affirmative (YES), the program skips over the step S29 to the step S30. At the step S30, the flag FCTWP(N) is set to "1" followed by terminating the program.

According to the present processing, the adherent fuel amount TWP(N) is calculated based on the final fuel amount period TOUTF, i.e. a total amount of fuel actually injected in the combustion cycle, which makes it possible to obtain or estimate an accurate value of the adherent fuel amount TWP(N). Therefore, it is possible to control the amount of fuel drawn into each cylinder with accuracy.

Next, description will be made of an outline of correction of the fuel injection amount carried out in the present embodiment, with reference to FIG. 6A to FIG. 6F.

FIG. 6A shows a sequence of strokes of a cylinder of the engine, and FIG. 6B. shows a sequence of stages described hereinabove. At a time point t1, a value of the fuel injection amount TOUT, inclusive of the ineffective time period TV, is set to an injection timer, whereby the fuel injection is started (see FIG. 6C and 6D). At the same time, an actual value of the fuel injection amount TOUT, exclusive of the ineffective time period TV, is set to the latch data TOUTLCH. If the newest value TOUT(n) of the fuel injection amount calculated at a time point t2 is larger than the actual fuel injection amount stored as the latch data TOUTLCH at the time point t1, i.e. the immediately preceding value TOUT(n−1) in the present case, the set value of the injection timer is increased by an incremental value corresponding to the difference between the two values. As a result, the fuel injection, which would be completed at a time point t3 without correction, is extended to a time point t4. In this way, the amount of the main injection is corrected.

Further, if the newest value TOUT(n) of the fuel injection amount calculated at a time point t5 is larger than the actual main injection amount which was actually injected in the immediately preceding injection and stored as the latch data TOUTLCH, an incremental value corresponding to the difference between the two values is additionally set to the injection timer, to carry out the additional injection from then up to a time point t6.

In the event that the present value TOUT(n) of the fuel injection amount calculate at the time point t2 is smaller than the actual value of the fuel injection amount stored as the latch data TOUTLCH, though this case is not shown in the figures, the set value of the injection timer is deceased by a decremental value corresponding to the difference between the two values, or alternatively the fuel injection is immediately terminated FIG. 6E and FIG. 6F show examples of changes in the count CNTINJ of a status counter indicative of the status of fuel injection control. FIG. 6E shows a case in which neither the correction of the main injection nor the additional injection is carried out, as indicated by the solid lines in FIG. 6C and 6D, while FIG. 6F shows a case in which both the correction of the main injection and the additional injection are carried out, as indicated by the broken lines in the same. More specifically, the count CNTINJ of the status counter is set to "0" during a waiting period, "1" during a main injection period, "2" during a post-main injection period, "3" during an additional injection period, "4" during a post-additional injection period, and "5" during a fuel injection-inhibiting period.

Figure 7A:
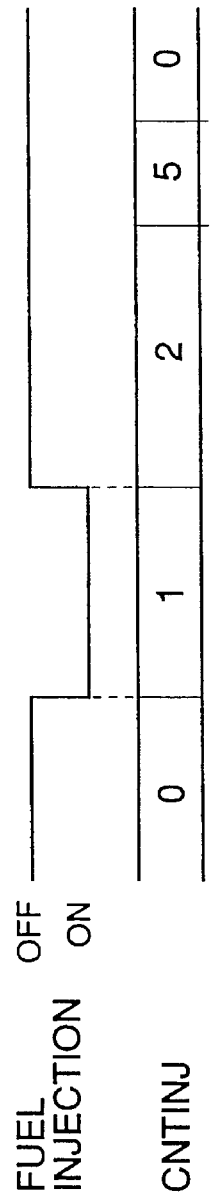
Figure 7B:
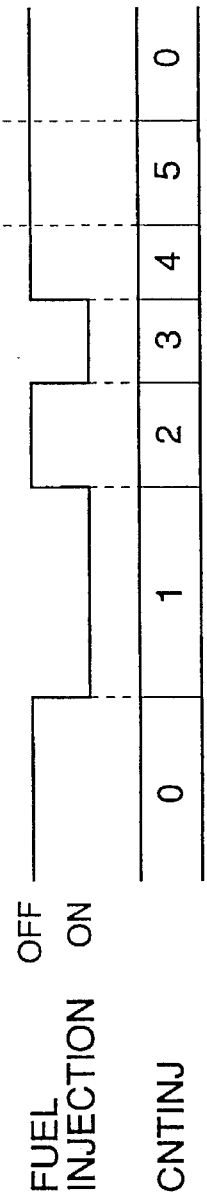
Figure 7C:
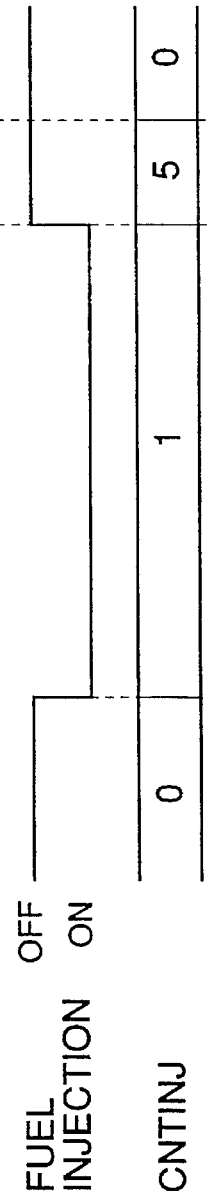
Figure 7D:
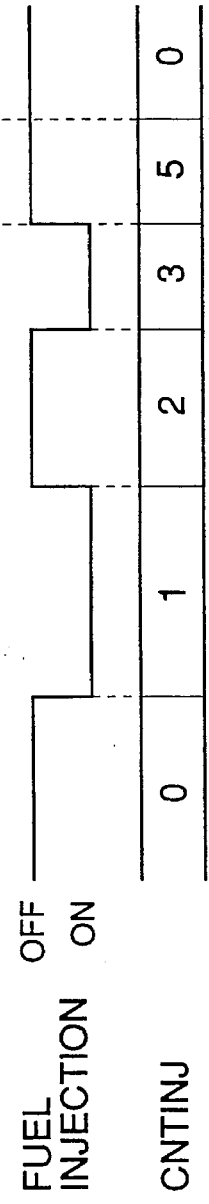
Figure 7E:
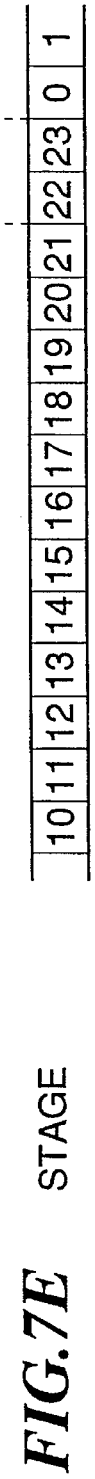

FIG. 7A to FIG. 7E also show examples of changes in the count CNTINJ of the status counter. FIG. 7A and FIG. 7B correspond to FIG. 6E and FIG. 6F, respectively. FIG. 7C shows a case in which the forced injection termination stage is reached during the main injection, while FIG. 7D shows a case in which the forced injection termination stage is reached during the additional injection. If the condition of TOUT=0 is fulfilled e.g. during fuel cut, though this case is not shown in the figures, the count CNTINJ is changed from "0" to "5" as the stage changes from #21 stage to #22 stage.

FIG. 8 shows a program for processing of the aforementioned correction of the main injection amount (fuel injection amount TOUT), which is executed in synchronism with generation of each CRK signal pulse.

First at a step S41, it is determined whether or not the count CNTINJ of the status counter is equal to "1". If the answer to this question is negative (NO), i.e. if the main injection is not being executed, the program is immediately terminated, Whereas if the answer is affirmative (YES), i.e. if the main injection is being carried out., the difference between the present value TOUT(n) of the fuel injection amount calculated this time and the actual value of the same stored as the latch data TOUTLCH and being currently used for fuel injection is calculated as an amount of change ΔTOUT in the fuel injection amount TOUT by the use of the following equation (9) at a step S42:

$$\Delta TOUT = TOUT(n) - TOUTLCH \qquad (9)$$

Then, it is determined at a step S43 whether or not the absolute value |ΔTOUT| of the amount of change is larger than a predetermined very small value TCHON. If the answer to the question of the step S43 is negative (NO), it is judged that no correction is required, and the present program is immediately terminated, whereas if the condition of |ΔTOUT|> TCHON is fulfilled, a remaining fuel injection amount TSTORE equivalent to an amount of fuel which remains to be injected is read in at a step S44, and it is determined at a step S45 whether or not the amount of change ΔTOUT assumes a negative value.

If the amount of change ΔTOUT assumes a positive value, the program proceeds to a steep S46, wherein the set value of the injection timer is increased by the amount of change ΔTOUT (see FIG. 9A and FIG. 9B), and then the latch data TOUTLCH is updated by setting the present value TOUT(n) of the fuel injection amount thereto to store the actual fuel injection amount injected in the present operating cycle at a step S47, followed by terminating the program.

If the amount of change ΔTOUT assumes a negative value, the program proceeds to a step S48, wherein it is determined whether or not fuel cut is being carried out. If the answer to this question is affirmative (YES), the program is immediately terminated to thereby permit the fuel injection already started to continue up to the end of the fuel injection period. This is because forced interruption of the fuel injection can cause a lean air-fuel ratio, resulting in degraded exhaust emission characteristics.

If fuel cut is not being carried out, it is determined at a step S49 whether or not the absolute value |ΔTOUT| of the amount of change in the fuel injection amount TOUT is smaller than the remaining fuel injection amount TSTORE. If the condition of |ΔTOUT|< TSTORE is fulfilled, the program proceeds to a step S52, wherein the set value of the injection timer is decreased by the absolute value|ΔTOUT| (see FIG. 9C and FIG. 9D), and then the latch data TOUT-LCH is updated by setting the present valve TOUT(n) of the fuel injection amount thereto to snore the actual fuel injection amount injected in the present operating cycle at a step S53, followed by terminating the program.

If the condition of |ΔTOUT|≧TSTORE is fulfilled, the set value of the injection timer is set to "0" at a step S50 (see FIG. 9E), and the latch data TOUTLCH (equivalent to an amount of fuel actually injected in the present cycle) is updated by the following equation (10) at a step S51, followed by terminating the program:

$$TOUTLCH = TOUCLCH - TSTORE \qquad (10)$$

The above processing is repeatedly carried so long as the main injection is carried out, as is clear from the step S41. Therefore, the latch data TOUTLCH, i.e. the actual fuel injection amount can be once corrected in the decreasing direction and thereafter in the increasing direction again, or vice versa.

According to the above described processing, the fuel injection amount is corrected based on the newest fuel injection amount TOUT calculated while fuel injection is being carried out, and therefore it is possible to improve the controllability of the air-fuel ratio when the engine is in a transient operating condition.

Figure 10:
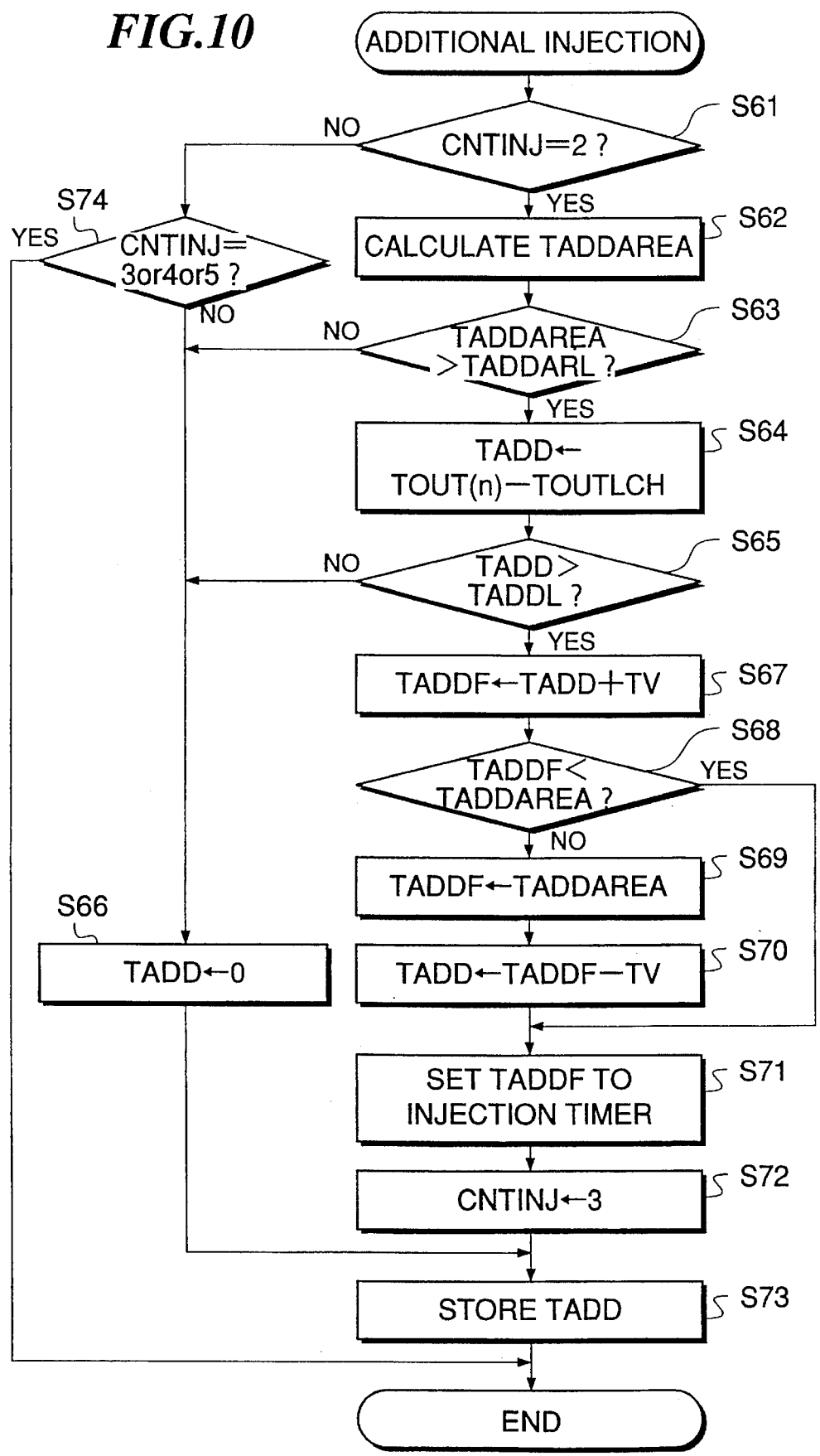
FIG. 10 is a flowchart showing a program for carrying out the additional injection.

FIG. 10 shows a program for processing of the aforementioned additional injection, which is executed in synchronism with generation of each CRK signal pulse.

At a step S61, it is determined whether or not the count CNTINJ of the status counter is equal to "2", i.e. whether or not the present stage comes after the main injection. If the CNTINT is not "2", the program proceeds to a step S74, wherein it is determined whether or not the count CNTINJ of the state counter is equal to "3 ", "4 ", or "5". If the CNTINJ is equal to any of these values, the present program is immediately terminated, while if the count CNTIN=2 is not equal to any of these values, the additional fuel injection amount TADD is set to "0" at step S66 and the set value of the additional fuel injection amount is further set to the latch data TADDLCH at a step S73, followed by terminating the program.

If the answer to the question of the step S61 is affirmative (YES), i.e. if CNTINJ=2, a surplus time period TADDAREA for carrying out the additional injection is calculated according to the forced injection termination stage OFFSTG and the engine rotational speed NE. Then, it is determined at a step S63 whether or not the surplus time period TADD-AREA ms longer than a predetermined time period TADD-ARL. If the answer to this question is negative (NO), the program proceeds to the step S66, not to carry out the additional injection, since the surplus time period is too short. If the condition of TADDAREA>TADDARL is fulfilled at the step S63, the latch data TOUTLCH, i.e. the actually applied value of the fuel injection amount is subtracted from the newest value TOUT(n) of the fuel injection amount TOUT by the use of the following equation (11) to calculate the additional fuel injection amount TADD at a step S64:

$$TADD = TOUT(n) - TOUTLCH \qquad (11)$$

Then, it is determined at a step S65 whether or not the additional fuel injection period TADD calculated is larger than a predetermined lower limit value TADDL. If TADD≦TADDL holds, the program proceeds to the step S66, since it is unnecessary to carry out the additional injection, whereas if TADD>TADDL holds, the ineffective time period TV is added to the additional fuel injection period TADD by the use of the following equation (12) to calculate a final additional fuel injection amount TADDF at a step S67:

$$TADDF=TADD+TV \quad (12)$$

At the following step S68, it is determined whether or not the final additional fuel injection amount TADDF is smaller than the surplus time period TADDAREA. If TADDF<TADDAREA holds, the program jumps over to a step S71, whereas if TADDF≧TADDARE holds, the final additional fuel injection amount TADDF is replaced by the surplus time period TADDAREA at a step S69, and the additional fuel injection amount TADD is set to a value obtained by subtracting the ineffective time period TV from the resulting final additional fuel injection amount TADDF at a step S70, followed by the program proceeding to the step S7.

At the step S71, the final additional fuel injection amount TADDF is set to the injection timer, and then the status counter is set to "3" at a step S72, and the additional fuel injection amount TADD is set to the latch data TADDLCH to store the actual additional fuel injection amount actually injected, at a step S73, followed by terminating the present program.

According to the above described processing, after termination of the main injection, if the surplus time period TADDAREA before the forced injection termination stage is longer than a predetermined time period and at the same time the newest value of the fuel injection amount TOUT is larger than an actually applied value indicated by the latch data TOUTLCH, by a predetermined value or more, the additional injection is carried out, which makes it possible to cope with an increase in the required amount of fuel occurring after termination of the main injection.

Figure 11:
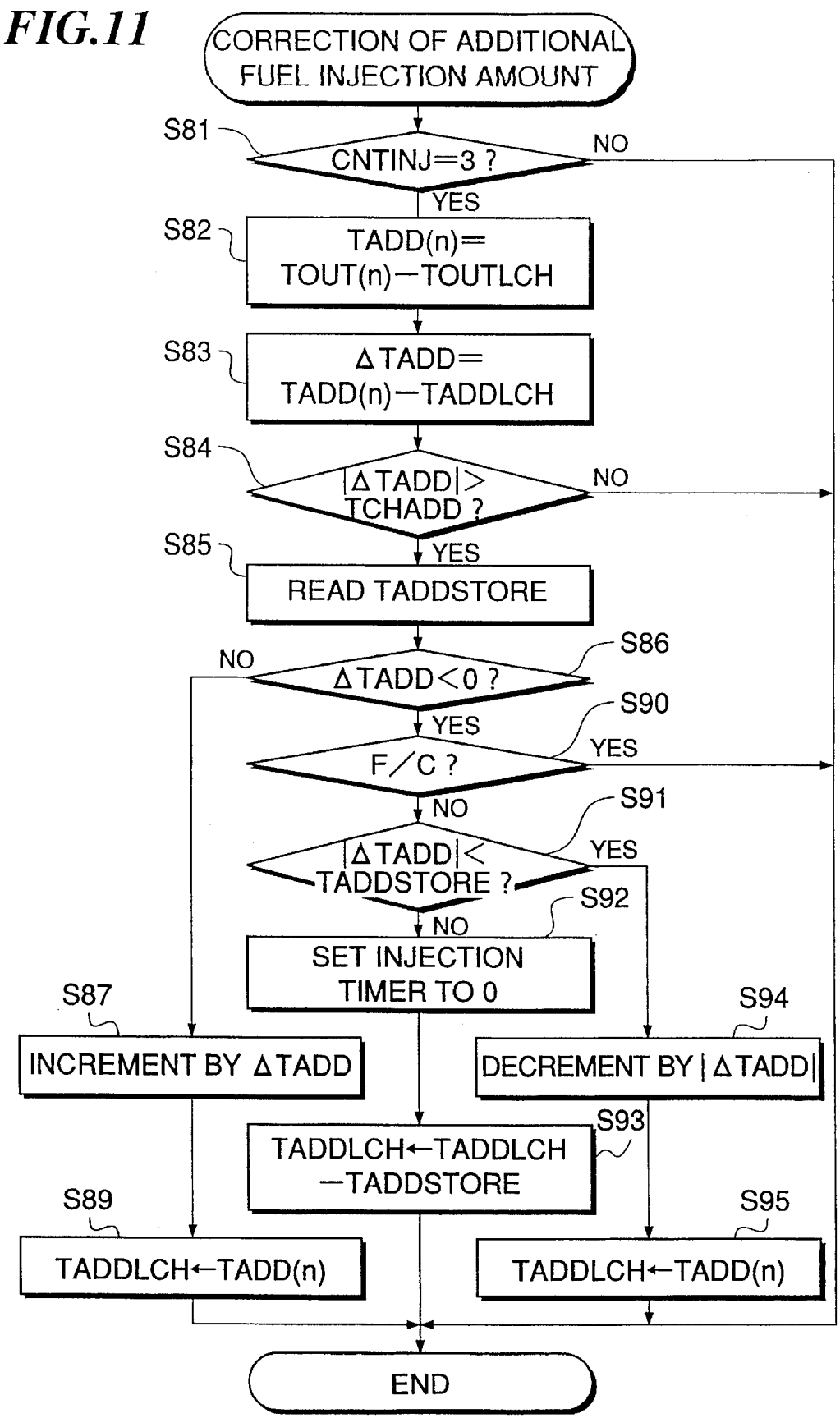
FIG. 11 is a flowchart showing a program for correcting an additional fuel injection amount during the additional injection.

FIG. 11 shows a program of processing for correction of the additional fuel injection amount in dependence on the newest value of the fuel injection amount TOUT obtained during execution of the additional injection, which is executed in synchronism with generation of each CRK signal pulse.

First, at a step S81, it is determined whether or not the count CNTINJ of the status counter is equal to "3" If the answer to this question is negative (NO), i.e. if the additional injection is not being carried out, the present program is immediately terminated, whereas if the count CNTINJ is equal to "3", i.e. if the additional injection is being carried out, the actual fuel injection amount stored as the latch data TOUTLCH currently being injected is subtracted from the present value TOUT(n) of the fuel injection amount to calculate the present value TADD(n) of the additional fuel injection amount by the use of the following equation (13), at a step S82:

$$TADD(n)=TOUT(n)-TOUTLCH \quad (13)$$

and then the actual additional fuel injection amount stored as the latch data TADDLCH is subtracted from the present value TADD(n) of the additional fuel injection amount to calculate an amount of change ΔTADD in the additional fuel injection amount by the use of the following equation (14) at a step S83:

$$\Delta TADD=TADD(n)TADDLCH- \quad (14)$$

where the latch data TADDLCH is equal to the actual additional fuel injection amount stored at the step S73 in FIG. 10, or a corrected value at the actual additional fuel injection amount calculated at a step S89, S93, or S95, referred to hereinafter.

Then, it is determined at a step S84 whether or not the absolute value |ΔTADD| of the amount of change is larger than a predetermined very small value TCHADD. If |ΔTADD|≦ TCHADD holds, it is judged that the additional fuel injection amount need not be corrected, and then the program is immediately terminated, whereas if |ΔTADD|> TCHADD, a remaining additional fuel injection amount TADDSTORE equivalent to an amount of fuel which remains to be additionally injected is read in at a step S85, and then it is determined at a step S86 whether or not the amount of change ΔTADD assumes a negative value.

If the amount of change ΔTADD does not assume a negative value, the program proceeds to a step S87, wherein the set value of the injection timer is increased by the amount of change ΔTADD, and then the present value TADD(n) of the additional fuel injection amount is set to the latch data TADDLCH at a step S89, followed by terminating the program.

If the amount of change ΔTADD assumes a negative value, the program proceeds to a step S90, wherein it is determined whether or not fuel out is being carried out. If fuel cut is being carried out, the program is immediately terminated to thereby permit the fuel injection already started to continue up to the end of the additional fuel injection period. This is because forced interruption of the fuel injection can cause a lean air-fuel ratio, resulting in degraded exhaust emission characteristics.

If fuel cut is not being carried out at the step S86, it is determined at a step S91 whether or not the absolute value ÅΔTADD| of the amount of change is smaller than the remaining additional fuel injection amount TADDSTORE. If the answer t6 this question is affirmative (YES), the program proceeds to a step S94, wherein the set value of the injection timer is decreased by the absolute value |ΔTADD| of the amount of change, and then the present value TADD(n) of the additional fuel injection amount is set to the latch data TADDLCH at a step S95, followed by terminating the program.

If the answer to the question of the step S91 is negative (NO), the injection timer is set to "0" at a step S92, and the latch data TADDTLCH is updated by the use of the following equation (15) at a step S93, followed by terminating the program:

$$TADDLCH=TADDLCH-TADDSTORE \quad (15)$$

According to the above described processing, the additional fuel injection amount is corrected based on the newest fuel injection amount TOUT calculated while the additional injection is being carried out, and therefore it is possible to improve the controllability of the air-fuel ratio when the engine is in a transient operating condition.

Figure 12:
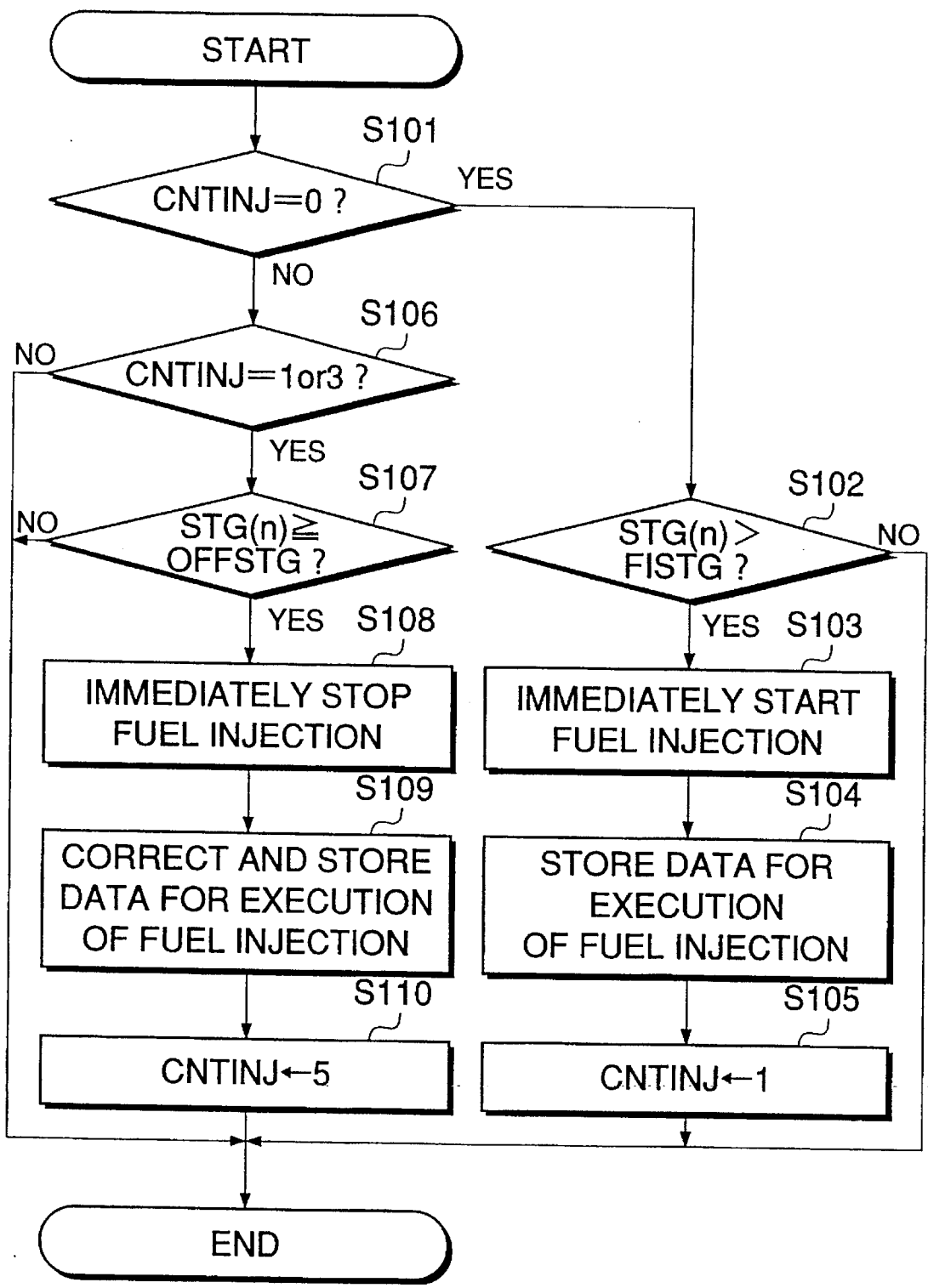
FIG. 12 is a flowchart showing a program for preventing failure to carry out an injection or an untimely fuel injection outside a predetermined time period during which fuel injection is permitted.

FIG. 12 shows a program for prevention of failure to effect fuel injection or over-injection (injection untimely carried out at #22 stage or #23 stage), which is executed in synchronism with generation of each CRK signal pulse.

First, at a step S101, it is determined whether or not the count CNTINJ of the status counter is equal to "0". If the answer to this question is affirmative (YES), it is determined at a step S102 whether or not the present stage STG(n) is past the injection start stage FISTG. If the present stage STG(n) is not past the injection start stage FISTG, the present processing is immediately terminated. The injection start stage FISTG is determined based on the fuel injection amount TOUT and the operating condition of the engine by another routine executed in synchronism with generation of each CRK signal pulse.

On the other hand, if the present stage STG(n) is past the injection start stage FISTG at the step S102, fuel injection is immediately started at a step S103, and at the same time data for execution of the fuel injection is stored at a step S104. Then, the count CNTINJ of the status counter is set to "1" at a step S105, followed by terminating the program. This ensures that fuel injection is reliably carried out, even if fuel injection fails to be started at a proper stage due to a sudden change in the operating condition of the engine.

If CNTINJ ≠"0" at the step S101, the program proceeds to a step S106, wherein it is determined whether or not the count CNTINJ of the status counter is equal to "1" or "3". If CNTINJ="1" or "3" indicating that fuel injection is being carried out, it is determined at a step S107 whether or not the present stage STG(n) is the forced injection termination stage OFFSTG or a stage following the same. If CNTINT ≠"1" or "3", or if the present stage STG(n) has not reached the forced injection termination stage OFFSTG, the present processing is immediately terminated. On the other hand, if the present stage STG(n) has reached the forced injection termination stage OFFSTG at the step S107, fuel injection is immediately terminated at a step S108, and at the same time the data currently in use for execution of the fuel injection is corrected and stored at a step S109. Then, the count CNTINJ of the status counter is set to "5" at a step S110, followed by terminating the program.

This makes it possible to prevent so-called over-injection and at the same time properly correct the latch data TOUT-LCH and TADDLCH= obtained at the forced injection termination, thereby permitting the adherent fuel amount TWP to be calculated with accuracy.

Further, the execution of an ordinary fuel injection is controlled by a control routine, not shown, executed in synchronism with generation of each CRK signal pulse or alternatively it synchronism with an output from a timer, whereby fuel starts to be injected based on the fuel injection amount TOUT at the injection start stage FISTG.

What is claimed is:

1. A fuel injection control system for an internal combustion engine having an intake passage, a crankshaft, and at least one cylinder, comprising:

fuel injection means for injecting fuel into said intake passage;

fuel injection amount-calculating means for calculating an amount of fuel to be injected by said fuel injection means in a manner carrying out fuel transfer delay-dependent correction based on a delay of transfer of fuel injected from the time said fuel is injected into said intake passage to the time said fuel is drawn into a corresponding one of said at least one cylinder, with a predetermined calculating repetition period during which said crankshaft rotates through predetermined angle smaller than a crank angle corresponding to one stroke of said engine, and for outputting a result of said calculation; and fuel injection-instructing means responsive to said result of said calculation output by said fuel injection amount-calculating means, for causing said fuel injection means to execute said fuel injection during a fuel injection-permitting time period set to allow at least part of said amount of fuel injected by said fuel injection means to be drawn into said corresponding one cylinder during an intake stroke of a present operating cycle of said corresponding one cylinder, wherein said fuel injection-instructing means corrects said amount of fuel to be injected by said fuel injection means during execution of said fuel injection, based on a newest value of said result of said calculation output by said fuel injection amount-calculating means during said execution of said fuel injection.

2. A fuel injection control system according to claim 1, wherein when said newest value of said result of said calculation output by said fuel injection amount-calculating means obtained after termination of said fuel injection is larger than an amount of fuel already injected based on said amount ok fuel to be injected, during said fuel injection-permitting time period, said fuel injection-instructing means causes said fuel injection means to carry out an additional fuel injection, based on said amount of fuel already injected and said newest value of said result of said calculation output by said fuel injection amount-calculating means.

3. A fuel injection control system according to claim 2, wherein said fuel injection-instructing means corrects an amount of fuel being currently injected, based on said newest value of said result of said calculation output from said fuel injection amount-calculating means during execution of said additional fuel injection.

4. A fuel injection control system according to claim 1, wherein said injection amount-calculating means carries out said fuel transfer delay-dependent correction based on said delay of transfer of fuel injected, based on an amount of fuel adhering to said intake passage and an amount of fuel carried off from said fuel fuel adhering to said intake passage, calculation of said amount of said fuel adhering to said intake passage being carried out it based on a total amount of fuel injected during said fuel injection-permitting time period.

5. A fuel injection control system according to claim 2, wherein said injection amount-calculating means carries out said fuel transfer delay-dependent correction based on said delay of transfer of fuel injected, based on an amount of fuel adhering to said intake pipe and an amount of fuel carried off from said fuel fuel adhering to said intake passage, calculation of said amount of said fuel adhering to said intake passage being carried out based on a total amount of fuel injected during said fuel injection-permitting time period.

6. A fuel injection control system according to claim 3, wherein said injection amount-calculating means carries out said fuel transfer delay-dependent correction based on said delay of transfer of fuel injected, based on an amount of fuel adhering to said intake pipe and an amount of fuel carried off from said fuel fuel adhering to said intake passage, calculation of said amount of said fuel adhering to said intake passage being carried out based on a total amount of fuel injected during said fuel injection-permitting time period.

7. A fuel injection control system according to claim 1, wherein said fuel injection-instructing means does not correct said amount of fuel to be injected by said fuel injection means when a required amount of correction of said amount of fuel to be injected is smaller than a predetermined value.

8. A fuel injection controls system according to claim 1, wherein said fuel injection-instructing means does not correct said amount of fuel to be injected by said fuel injection means, when fuel cut is being carried out and at the same time said amount of fuel to be injected by said fuel injection means should be corrected in a decreasing direction.

9. A fuel injection control system according to claim 1, wherein said fuel injection-instructing means immediately inhibits said fuel injection by said fuel injection means when a required amount of correction of said amount of fuel to be injected by said fuel injection means in a decreasing direction is larger than a portion of said amount of fuel remaining to be injected.

10. A fuel injection control system according to claim 1, wherein said fuel injection-instructing means corrects said amount of fuel to be injected by said fuel injection means, based on a difference between an actual value of said amount of fuel to be injected, which is set for fuel injection being currently carried out, and said newest value of said result of said calculation output from said fuel injection amount-calculating means.

11. A fuel injection control system according to claim 10, wherein said fuel injection-instructing means determines said difference between said actual value of said amount of fuel to be injected, which is set for fuel injection being currently carried out, and said newest value of said result of said calculation output from said fuel injection amount-calculating means, by subtracting the former from the latter, and when said difference assumes a negative value, if fuel cut is not being carried out and the absolute value of said difference is smaller than a remaining amount of fuel to be injected, said fuel injection-instructing means updating said actual value of said amount of fuel to be injected by subtracting said difference from said actual value of said amount of fuel to be injected, which is set for fuel injection being currently carried out.

12. A fuel injection control system according to claim 10, wherein said fuel injection-instructing means determines said difference between said actual value of said amount of fuel to be injected, which is set for fuel injection being currently carried out, and said newest value of said result of said calculation output from said fuel injection amount-calculating means, by subtracting the former from the latter, and when said difference assumes a negative value, if fuel cut is not being carried out and the absolute value of said difference is larger than a remaining amount of fuel to be injected, said fuel injection-instructing means immediately inhibiting said fuel injection by said fuel injection means, and changing said actual value of said amount of fuel to by injected to a value obtained by subtracting said remaining amount of fuel to be injected from said actual value of said amount of fuel to be injected, for storage thereof.

13. A fuel injection control system according to claim 4, wherein said fuel injection-instructing means corrects said amount of fuel to be injected by said fuel injection means, based on a difference between an actual value of said amount of fuel to be injected, which is set for fuel injection being currently carried out, and said newest value of said result of said calculation output from said fuel injection amount-calculating means.

14. A fuel injection control system according to claim 5, wherein said fuel injection-instructing means corrects said amount of fuel to be injected by said fuel injection means, based on a difference between an actual value of said amount of fuel to be injected, which is set for fuel injection being, currently carried out, and said newest value of said result of said calculation output from said fuel injection amount-calculating means.

15. A fuel injection control system according to claim 6, wherein said fuel injection-instructing means corrects said amount of fuel to be injected by said fuel injection means, based on a difference between an actual value of said amount of fuel to be injected, which is set for fuel injection being currently carried out, and said newest value of said result of said calculation output from said fuel injection amount-calculating means.

16. A fuel injection control system according to claim 10, wherein said fuel-instructing means includes memory means for separately storing values of said actual value of said amount of fuel to be injected for use in respective fuel injections carried out during said fuel injection-permitting time period.

17. A fuel injection control system for an internal combustion engine having an intake passage, and at least one cylinder, comprising:

fuel injection means for injecting fuel into said intake passage;

fuel injection amount-calculating means for calculating an amount of fuel to be injected by said fuel injection means in a manner carrying out fuel transfer delay-dependent correction based on a delay of transfer of fuel injected from the time said fuel is injected into said intake passage to the time said fuel is drawn into a corresponding one of said at least one cylinder, with a predetermined calculating repetition period, and for outputting a result of said calculation; and fuel injection-instructing means responsive to said result of said calculation output by said fuel injection amount-calculating means, for causing said fuel injection means to execute said fuel injection during a fuel injection-permitting time period set to allow at least part of said amount of fuel injected by said fuel injection means to be drawn into said corresponding one cylinder during an intake stroke of a present operating cycle of said corresponding one cylinder, wherein said fuel injection-instructing means corrects said amount of fuel to be injected by said fuel injection means during execution of said fuel injection, based on a newest value of said result of said calculation output by said fuel injection amount-calculating means during said execution of said fuel injection, and wherein said injection amount calculating means carries out said fuel transfer delay-dependent correction based on said delay of transfer of fuel injected, based on an amount of fuel adhering to said intake passage and an amount of fuel carried off from said fuel fuel adhering to said intake passage, calculation of said amount of said fuel adhering to said intake passage being carried out based on a total amount of fuel injected during said fuel injection-permitting time period.

18. A fuel injection control system according to claim 17, wherein said fuel injection-instructing means corrects said amount of fuel to be injected by said fuel injection means, based on a difference between an actual value of said amount of fuel to be injected, which is set for fuel injection being currently carried out, and said newest value of said result of said calculation output from said fuel injection amount-calculating means.

19. A fuel injection control system for an internal combustion engine having an intake passage, and at least one cylinder, comprising:

fuel injection means for injecting fuel into said intake passage;

fuel injection amount-calculating means for calculating an amount of fuel to be injected by said fuel injection means in a manner carrying out fuel transfer delay-dependent correction based on a delay of transfer of fuel injected from the time said fuel is injected into said intake passage to the time said fuel is drawn into a corresponding one of said at least one cylinder, with a predetermined calculating repetition period, and for outputting a result of said calculation; and fuel injection-instructing means responsive to said result of said calculation output by said fuel injection amount-calculating means, for causing said fuel injection means to execute said fuel injection during a fuel injection-permitting time period set to allow at least part of said amount of fuel injected by said fuel injection means to be drawn into said corresponding one cylinder during an intake stroke of a present operating cycle of said corresponding one cylinder, wherein said fuel injection-instructing means corrects said amount of fuel to be injected by said fuel injection means during execution of said fuel injection, based on a newest value of said result of said calculation output by said fuel injection amount-calculating means during said execution of said fuel injection, wherein when said newest value of said result of said calculation output by said fuel injection amount-calculating means obtained after termination of said fuel injection is larger than an amount of fuel already injected based on said amount of fuel to be injected, during said fuel injection-permitting time period, said fuel injection-instructing means causes said fuel injection means to carry out an additional fuel injection, based on said amount of fuel already injected and said newest value of said result of said calculation output by said fuel injection amount-calculating means, and wherein said injection amount-calculating means carries out said fuel transfer delay-dependent correction based on said delay of transfer of fuel injected, based on an amount of fuel adhering to said intake pipe and an amount of fuel carried off from said fuel fuel adhering to said intake passage, calculation of said amount of said fuel adhering to said intake passage being carried out based on a total amount of fuel injected during said fuel injection-permitting time period.

20. A fuel injection control system according to claim 19, wherein said fuel injection-instructing means corrects said amount of fuel to be injected by said fuel injection means, based on a difference between an actual value of said amount of fuel to be injected, which is set for fuel injection being currently carried out, and said newest value of said result of said calculation output from said fuel injection amount-calculating means.

21. A fuel injection control system for an internal combustion engine having an intake passage, and at least one cylinder, comprising:

fuel injection means for injecting fuel into said intake passage;

fuel injection amount-calculating means for calculating an amount of fuel to be injected by said fuel injection means in a manner carrying out fuel transfer delay-dependent correction based on a delay of transfer of fuel injected from the time said fuel is injected into said intake passage to the time said fuel is drawn into a corresponding one of said at last one cylinder, with a predetermined calculating repetition period, and for outputting a result of said calculation; and fuel injection-instructing means responsive to said result of said calculation output by said fuel injection amount-calculating means, for causing said fuel injection means to execute said fuel injection during a fuel injection-permitting time period set to allow at least part of said amount of fuel injected by said fuel injection means to be drawn into said corresponding one cylinder during an intake stroke of a present operating cycle of said corresponding one cylinder, wherein said fuel injection-instructing means corrects said amount of fuel to be injected by said fuel injection means during execution of said fuel injection, based on a newest value of said result of said calculation output by said fuel injection amount-calculating means during said execution of said fuel injection, wherein when said newest value of said result of said calculation output by said fuel injection amount-calculating means obtained after termination of said fuel injection is larger than the amount of fuel already injected based on said amount of fuel to be injected, during said fuel injection-permitting time period, said fuel injection-instructing means causes said fuel injection means to carry out an additional fuel injection, based on said amount of fuel already injected and said newest value of said result of said calculation output by said fuel injection amount-calculating means, wherein said fuel injection-instructing means corrects an amount of fuel being currently injected, based on said newest value of said result of said calculation output from said fuel injection amount-calculating means during execution of said additional fuel injection, and wherein said injection amount calculating means carries out said fuel transfer delay-dependent correction based on said delay of transfer of fuel injected, based on an amount of fuel adhering to said intake pipe and an amount of fuel carried off from said fuel fuel adhering to said intake passage, calculation of said amount of said fuel adhering to said intake passage being carried out based on a total amount of fuel injected during said fuel injection-permitting time period.

22. A fuel injection control system according to claim 21, wherein said fuel injection-instructing means corrects said amount of fuel to be injected by said fuel injection means, based on a difference between an actual value of said amount of fuel to be injected, which is set for fuel injection being currently carried out, and said newest value of said result of said calculation output from said fuel injection amount-calculating means.

23. A fuel injection control system for an internal combustion engine having an intake passage, and at least one cylinder, comprising:

fuel injection means for injecting fuel into said intake passage;

fuel injection amount-calculating means for calculating an amount of fuel to be injected by said fuel injection means in a manner carrying out fuel transfer delay-dependent correction based on a delay of transfer of fuel injected from the time said fuel is injected into said intake passage to the time said fuel is drawn into a corresponding one of said at least one cylinder, with a predetermined calculating repetition period, and for outputting a result of said calculation; and fuel injection-instructing means responsive to said result of said calculation output by said fuel injection amount-calculating means, for causing said fuel injection means to execute said fuel injection during a fuel injection-permitting time period set to allow at least part of said amount of fuel injected by said fuel injection means to be drawn into said corresponding one cylinder during an intake stroke of a present operating cycle of said corresponding one cylinder, wherein said fuel injection-instructing means corrects said amount of fuel to be injected by said fuel injection means during execution of said fuel injection, based on a newest value of said result of said calculation output by said fuel injection amount-calculating means during said execution of said fuel injection, and wherein said fuel injection-instructing means does not correct said amount of fuel to be injected by said fuel injection means, when fuel cut is being carried out and at the same time said amount of fuel to be injected by said fuel injection means should be corrected in a decreasing direction.

24. A fuel injection control system for an internal combustion engine having an intake passage, and at least one cylinder, comprising:

fuel injection means for injecting fuel into said intake passage;

fuel injection amount-calculating means for calculating an amount of fuel to be injected by said fuel injection means in a manner carrying out fuel transfer delay-dependent correction based on a delay of transfer of fuel injected from the time said fuel is injected into said intake passage to the time said fuel is drawn into a corresponding one of said at least one cylinder, with a predetermined calculating repetition period, and for outputting a result of said calculation; and fuel injection-instructing means responsive to said result of said calculation output by said fuel injection amount-calculating means, for causing said fuel injection means to execute said fuel injection during a fuel injection-permitting time period set to allow at least part of said amount of fuel injected by said fuel injection means to be drawn into said corresponding one cylinder during an intake stroke of a present operating cycle of said corresponding one cylinder, wherein said fuel injection-instructing means corrects said amount of fuel to be injected by said fuel injection means during execution of said fuel injection, based on a newest value of said result Of said calculation output by said fuel injection amount-calculating means during said execution of said fuel injection, and wherein said fuel injection-instructing means immediately inhibits said fuel injection by said fuel injection means when a required amount of correction of said amount of fuel to be injected by said fuel injection means in a decreasing direction is larger than a portion of said amount of fuel remaining to be injected.

25. A fuel injection control system for an internal combustion engine having an intake passage, and at least one cylinder, comprising:

fuel injection means for injecting fuel into said intake passage;

fuel injection amount-calculating means for calculating an amount of fuel to be injected by said fuel injection means in a manner carrying out fuel transfer delay-dependent correction based on a delay of transfer of fuel injected from the time said fuel is injected into said intake passage to the time said fuel is drawn into a corresponding one of said at least one cylinder, with a predetermined calculating repetition period, and for outputting a result of said calculation; and fuel injection-instructing means responsive to said result of said calculation output by said fuel injection amount-calculating means, for causing said fuel injection means to execute said fuel injection during a fuel injection-permitting time period set to allow at least part of said amount of fuel injected by said fuel injection means to be drawn into said corresponding one cylinder during an intake stroke of a present operating cycle of said corresponding one cylinder, wherein said fuel injection-instructing means corrects said amount of fuel to be injected by said fuel injection means during execution of said fuel injection, based on a newest value of said result of said calculation output by said fuel injection amount-calculating means during said execution of said fuel injection, wherein said fuel injection-instructing means corrects said amount of fuel to be injected by said fuel injection means, based on a difference between an actual value of said amount of fuel to be injected, which is set for fuel injection being currently carried out, and said newest value of said result of said calculation output from said fuel injection amount-calculating means, and wherein said fuel injection-instructing means determines said difference between said actual value of said amount of fuel to be injected, which is set for fuel injection being currently carried out, and said newest value of said result of said calculation output from said fuel injection amount-calculating means, by subtracting the former from the latter, and when said difference assumes a negative value, of fuel cut is not being carried out and the absolute value of said difference is smaller than a remaining amount of fuel to be injected, said fuel injection-instructing means updating said actual value of said amount of fuel to be injected by subtracting said difference from said actual value of fuel to be injected, which is set for fuel injection being currently carried out.

26. A fuel injection control system for an internal combustion engine having an intake passage, and at least one cylinder, comprising:

fuel injection means for injecting fuel into said intake passage;

fuel injection amount-calculating means for calculating an amount of fuel to be injected by said fuel injection means in a manner carrying out fuel transfer delay-dependent correction based on a delay of transfer of fuel injected from the time said fuel is injected into said intake passage to the time said fuel is drawn into a corresponding one of said at least one cylinder, with a predetermined calculating repetition period, and for outputting a result of said calculation; and fuel injection-instructing means responsive to said result of said calculation output by said fuel injection amount-calculating means, for causing said fuel injection means to execute said fuel injection during a fuel injection-permitting time period set to allow at least part of said amount of fuel injected by said fuel injection means to be drawn into said corresponding one cylinder during an intake stroke of a present operating cycle of said corresponding one cylinder, wherein said fuel injection-instructing means corrects said amount of fuel to be injected by said fuel injection means during execution of said fuel injection, based on a newest value of said result of said calculation output by said fuel injection amount-calculating means during said execution of said fuel injection, wherein said fuel injection-instructing means corrects said amount of fuel to be injected by said fuel injection means, based on a difference between an actual value of said amount of fuel to be injected, which is set for fuel injection being currently carried out, and said newest value of said result of said calculation output from said fuel injection amount-calculating means, and wherein said fuel injection-instructing means determines said difference between said actual value of said amount of fuel to be injected, which is set for fuel injection being currently carried out, and said newest value of said result of said calculation output from said fuel injection amount-calculating means, by subtracting the former from the latter, and when said difference assumes a negative value, if fuel cut is not be carried out and the absolute value of said difference is larger than a remaining amount of fuel to be injected, said fuel injection-instructing means immediately inhibiting said fuel injection by said fuel injection means, and changing said actual value of said amount of fuel to be injected to a value obtained by subtracting said remaining amount of fuel to be injected from said actual value of said amount of fuel to be injected, for storage thereof.

* * * * *